United States Patent [19]

Camardella

[11] 4,211,913

[45] Jul. 8, 1980

[54] AUTOMATIC WELDING OF RESISTANCE WIRES ON RESISTORS TERMINALS

[75] Inventor: Giuseppe Camardella, Saronno, Italy

[73] Assignee: Tekma Kinomat S.p.A., Caronno Pertusella, Italy

[21] Appl. No.: 872,500

[22] Filed: Jan. 26, 1978

[30] Foreign Application Priority Data

Jan. 27, 1977 [IT] Italy ................................ 19689 A/77

[51] Int. Cl.[2] ................................................ B23K 11/00

[52] U.S. Cl. ................................ 219/56.22; 219/56.1; 228/4.5

[58] Field of Search ......................... 228/4.5, 6 A, 179; 219/56.1, 56.21, 56.22; 338/329

[56] References Cited

U.S. PATENT DOCUMENTS

| | | | |
|---|---|---|---|
| 2,479,556 | 8/1949 | Chanowitz | 219/56.22 |
| 3,297,855 | 1/1967 | Bowers | 219/56.22 X |
| 3,368,059 | 2/1968 | Scott et al. | 219/56.22 X |

*Primary Examiner*—E. A. Goldberg

*Attorney, Agent, or Firm*—Young & Thompson

[57] ABSTRACT

The disclosure relates to a method for electrically welding the ends of metal wires to metal terminals of electrical resistors. An arcuate profile electrode is used which is given a rocking movement, during the rocking movement several electrical welding discharges are fed in rapid succession to perform the welding.

17 Claims, 11 Drawing Figures

AUTOMATIC WELDING OF RESISTANCE WIRES ON RESISTORS TERMINALS

BACKGROUND OF THE INVENTION

1. Field of the Invention

This invention relates to a method and apparatus for automatically welding wires, and especially thin wires, to supports or terminals.

More particularly, this method and apparatus are designed for use in manufacturing electrical resistors of the type comprising an insulating ceramic, steatite or alumina rod, on which a spiral of resistance wire is wound and anchored at its ends to metal terminals fixed to the two ends of the rod. This anchoring is obtained by welding the ends of the spiral winding to said terminals.

Although specific reference is made hereinafter to the manufacture of electrical resistors of the aforesaid type, this reference is made by way of example only, and the same method may find application in other similar uses.

With reference to the manufacture of electrical resistors, these are constituted by an insulating rod which may be of various sizes, for example with a diameter of 3 to 20 mm and a length of 10 to 100 mm or more, and which is provided at its ends with metal terminals in the form of caps for the smaller sizes, or clips for the larger sizes.

The resistance wire wound on the rod is welded to these terminals by electric welding, said resistance wire being in the form of a strip for resistors of lower value, or in the form of a thin or very thin wire, the size of which may reach capillary dimensions, for resistors of higher value.

2. Description of the Prior Art

At the present time, these resistors are manufactured using bench coil winding machines, on which the operator electrically welds the beginning and end of the winding manually to the terminals of the insulating rod.

No special difficulty is encountered in practice with this method, with the obvious exception of the slowness of the operation and the heavy use of specialised labour, because it is always possible to repair the defective weld by moving the manual electrode slightly and remaking it, until the operator considers it satisfactory.

The object of the present invention is to enable this welding to be carried out completely automatically, in the same coil winding machine by which the resistance wire is wound.

More particularly, the method and apparatus according to the present invention are suitable for application in a turret coil winding machine of known type, which is already able to carry out automatically all the other operations involved in manufacturing said resistors, including the loading of the empty insulating rod, the winding of the resistance wire, the checking of the resistor value, and the unloading.

In tests carried out up to the present time on automatic coil winding machines, the automatic welding of resistance wires, whether in the form of strips, thin wires or capillary wires, has given rise to a series of problems.

With thin wire, for example of a few tenths of a millimeter in diameter, when it reaches the end of the winding and encounters the edge of the metal terminal (cap or clip), this edge may momentarily repel the wire and cause it to travel through a further fraction of a turn on the rod. Consequently, when the wire finally overcomes the edge and climbs on to the terminal, it is in a position which does not correspond to the theoretically required position, and generally varies quite casually. Under such conditions, it is preferred to use a welding electrode with an elongated profile, operating along an entire generating line of the terminal, i.e. an axial line portion which must of necessity be traversed by the end portion of the wire which has finished the winding, whatever—as said above—its variable axial position, so that the electrode always rests securely on the wire and the welding discharge passes through it without fail.

In the case of thinner wires, i.e. capillary wires having a diameter less than 0.1 mm, other circumstances must be considered, such as:

the possibility that the cap terminals may not have been mounted coaxially on the insulating rod, the possible malformation of the surface of the cap terminal, e.g. barrel shaped, bell shaped or undulated, the possible incorrect positioning of the welding electrode, in particular in a position not parallel to the axis of the cap.

Consequently the tendency, in contrast to that stated heretofore, is to prefer a welding electrode which is as reduced as possible, or nearly in the form of a point. In this respect, with an elongated electrode it would not be possible to ensure that the welding discharge takes place always exactly through the wire to be welded, rather than at points adjacent to it on the metal terminal surface, these points projecting beyond the wire on account of the small wire thickness. On the other hand, if the electrode is in the form of a point, the axial position of the wire to be welded must be sought, and this is obviously neither easy nor rapid.

With resistors constructed of larger strip wires, there is an essentially economical problem in relation to the fact that said resistors are formed from just a few turns of strip, the length of which is very reduced. In this case, the length of the strip to form the resistor is practically of the same order of magnitude as the length of strip connecting two successive resistors being formed on a winding machine, if not smaller. Thus, having welded the strip ends to the resistor terminals and cut them, the remaining length of connecting strip results in considerable scrap, which represents a substantial proportion of the total cost of the material used, and can reach more than 50% of the strip fed.

SUMMARY OF THE INVENTION

The main object of the present invention is to provide a welding apparatus able to satisfy the aforesaid opposing requirements by ensuring perfect welding of thick, thin and capillary wires irrespective of the axial position which they assume when in contact with the surface of the metal terminal.

A further important object of the present invention is to fix the wire end to the terminal in two welding positions which are close to each other, the first being the actual welding position and the second being the position at which the wire is also detached.

Finally, an even further important object of the present invention is to provide an apparatus able to considerably reduce scrap, in particular in the manufacture of resistors formed from thick wire or strip.

These objects are attained according to the present invention by a welding method in which:

at least one welding electrode is used, of thin, elongated arcuate profile, with its convexity facing the wire to be welded, one of the ends of said arcuate profile of said electrode is placed in contact with the surface of the metal terminal, the electrode is then given a rocking movement, the centre of instantaneous rotation of which coincides with the point of contact of the electrode with the surface of the terminal, and is gradually moved along said generating or axial welding line, and several electrical welding discharges are fed in rapid succession to said point of contact, through said electrode, during the rocking movement thereof.

The present invention also provides an apparatus for automatically welding the ends of metal wires to metal terminals, wherein said terminals have an essentially cylindrical surface on which the wire to be welded is rested obliquely and transversely to a generating or axial welding line, comprising:

at least one essentially flat welding electrode lying in a plane passing through said generating or axial welding line and of thin arcuate profile with its convexity facing the wire to be welded, resilient pressing means for keeping the electrode profile in contact with the welding surface, means for giving the electrode a rocking movement, the centre of instantaneous rotation of which is constituted by the point of contact of the electrode with the welding surface, this point of contact being progressively mobile along said generating or axial welding line, and condenser discharge means for feeding several electrical welding discharges in succession through said electrode.

BRIEF DESCRIPTION OF THE DRAWINGS

Further characteristics and advantages of the present invention will be evident from the description given hereinafter by way of example of some preferred embodiments, illustrated in the accompanying drawings in which.

DESCRIPTION OF THE PREFERRED EMBODIMENT

Figure 1:
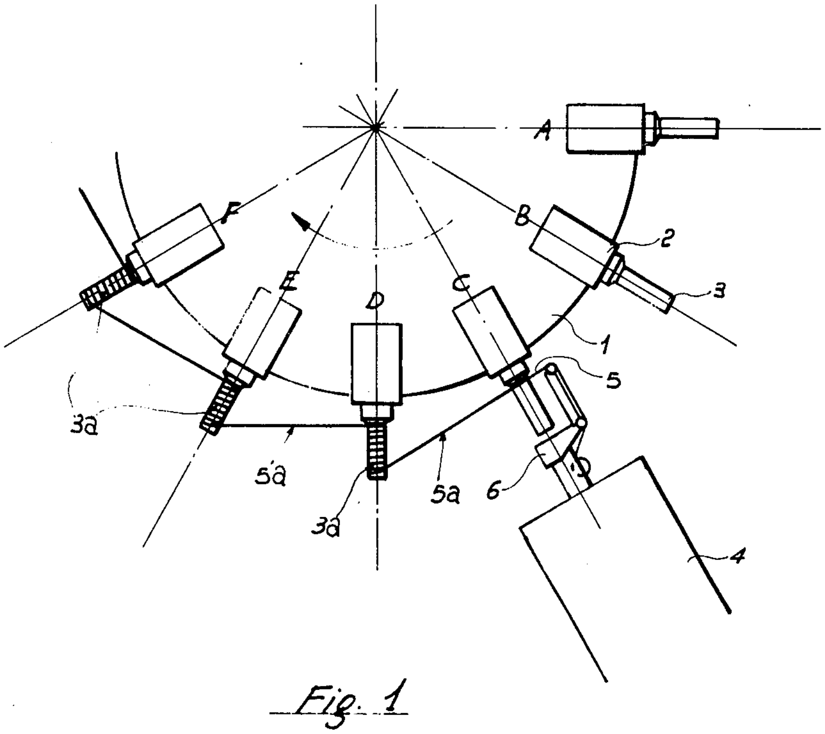
FIG. 1 is a diagrammatic plan view of a coil winding machine arranged for manufacturing electrical resistors from wound metal wire.

As shown diagrammatically in FIG. 1, several supports 2 are uniformly distributed over the periphery of the rotating table 1 of a coil winding machine, and each is arranged to support an insulating rod 3 for forming an electrical resistor.

After being loaded on to its respective support 2 in station A or B of the machine, the rod 3 is transferred to station C, in which a winding head 4 winds the wire 5 thereon by means of the rotating wire guide 6. The winding is made for a predetermined number of turns, according to the required final value of the electrical resistor.

The wound resistor 3*a* is then completed in one of the subsequent stations, for example D, E, F, by welding the ends of its winding to the metal terminal caps on the rod 3 (not shown in FIG. 1), cutting the portions of wire 5*a* which connect one coil to the next under formation, and unloading the finished piece, this unloading possibly being preceded by complementary operations such as a check on its resistance value.

A device for welding the wire end to the metal terminal 8 of the rod 3 therefore operates in one of these stations. This is normally done by means of an electrical weld made with an electrode 7 (see FIG. 3) which has a straight elongated welding profile 7*a*, extending parallel to the longitudinal axis x—x of the insulating rod 3. The wire 5 to be welded is held tightly against the surface of the metal terminal 8 of the rod 3 by the pressure exerted by the welding electrode 7.

Under normal conditions, i.e. when both the profile 7*a* of the electrode 7 and the surface opposing it on the terminal 8 are parallel to the x axis, the electrical discharge between the electrode 7 and surface 8 can pass only through the wire 7, which represents the only point of electrical contact, whatever the axial position of the wire 5 along the surface of the terminal 8.

Figure 3:
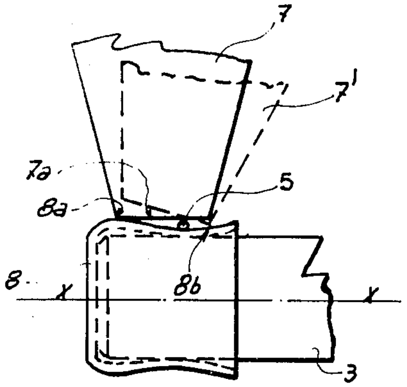
FIG. 3 is a lateral diagrammatic view to a very enlarged scale of the manner of operating an electrode of the known art.

However, when capillary wires are to be welded, this arrangement notably gives rise to two drawbacks, as mentioned heretofore:

when the surface of the terminal 8 is malformed, it can happen that the capillary wire disposes itself in a recessed region of this surface, as shown, and consequently the contact between the electrode and terminal 8 is produced not through the wire 5 but at another point, for example the point 8*a*, even when the surface of the terminal 8 is flat, but the profile 7*a* of the electrode 7 is accidentally oblique relative to the x-x axis, as indicated by the dashed line 7′ in FIG. 3, the contact may occur at a point 8*b* which does not coincide with the position of the wire 5.

Figure 4:
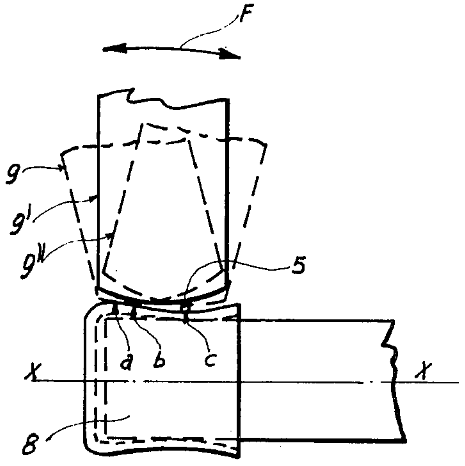
FIG. 4 is a view similar to that of FIG. 3, but relative to an electrode according to the invention.

Whereas, according to the present invention an electrode 9 as shown in FIG. 4 is used, the elongated profile 9*a* of which is arcuate with its convexity facing the wire to be welded, or the welding surface of the terminal 8.

This electrode is rocked, in the manner described hereinafter, with a movement in the direction of the arrow F of FIG. 4, which causes it to pass through the positions indicated by 9, 9′ and 9″, the position 9′ being shown by a continuous line, whereas the positions 9 and 9″ are shown by dashed lines. Each of these positions corresponds with one point of contact, a, b, or c respectively, between the electrode 9 and terminal 8, and in at least one of these points, the contact (namely point c in FIG. 4) occurs through the wire 5 even if this latter is located in a recessed region of the surface of the terminal 8 (analogous to that described with reference to FIG. 3).

Thus by using an arcuate profile for the electrode 9 and making it rock in the direction of the arrow F, it is ensured that in at least one of the positions assumed by the electrode the contact between the electrode and the terminal 8 definitely takes place via the wire 5. Consequently, if an electrical discharge is fed through the electrode at each of the positions 9, 9′ and 9″, simultaneous welding of the wire 5 at the aforesaid contact position is ensured.

Figure 7:
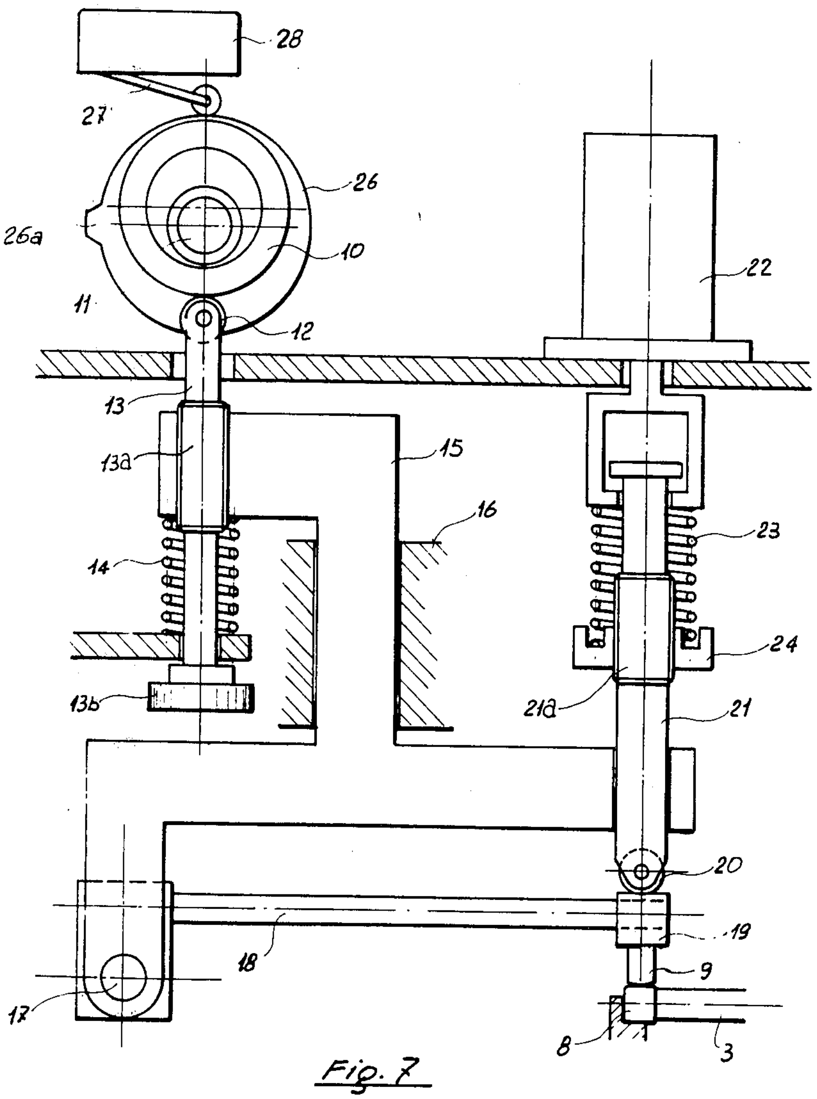
FIG. 7 is a diagrammatic side view of the unit for controlling the rocking movement of the electrode according to the invention.

The apparatus shown in FIG. 7 is used for rocking the electrode 9 in the manner described with reference to FIG. 4.

In this apparatus, a cam 10 keyed on the rotatable shaft 11 acts on the roller 12 carried at the upper end of the vertical rod 13, to give this rod vertical reciprocating movements. The movement given to the rod 13 is contrasted by the spring 14 coaxial to the rod 13.

The rod 13 also comprises a threaded part 13*a*, which engages in a corresponding threaded seat in the member 15. By rotating the rod 13 with the respective knob 13*b*, the position of the member 15 is adjusted relative to the rod 13. The member 15 is vertically slidable in its own fixed seat 16, and can thus follow the rod 13 in its vertical reciprocating movements.

The member 15 carries a pin 17 on which the arm 18 is mounted to swivel freely. At its other end, the arm 18 carries a head 19 on which are fixed both the electrode 9 and a second electrode 9A (FIGS. 5 and 6), the function of which will be explained hereinafter.

The roller 20 carried by the vertically slidable rod 21 rests on the head 19 to apply a predetermined welding pressure to this head. This pressure is provided by the pneumatic cylinder 22 via the spring 23 coaxial with the rod 21. A ring nut 24, screwed on to a threaded part 21*a* of the rod 21 and serving as a support for the spring 23, enables the initial preloading of the spring 23 to be adjusted, thus adjusting the welding pressure.

It is apparent from the aforesaid, and therefore does not require further explanation, that the vertical reciprocating movement of the rod 13 provided by the cam 10 and followed by the member 15 is converted into a rocking movement of the electrode 9, 9A as described with reference to FIG. 4.

Figure 8:
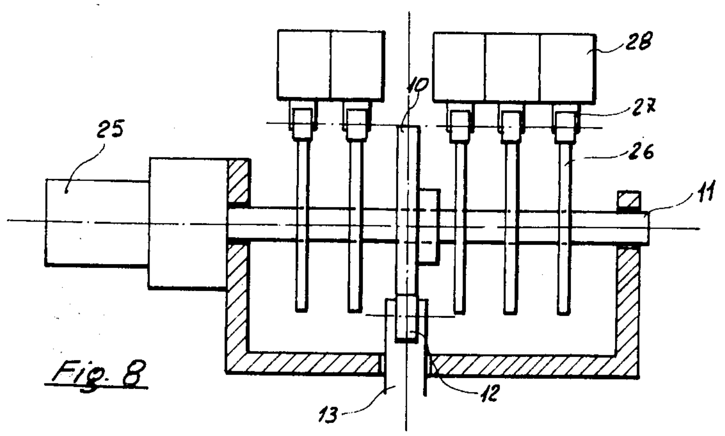
FIG. 8 is a diagrammatic plan view of the unit for feeding the succession of electrical welding discharges.

Cams 26, each provided with a tooth 26*a* (see FIGS. 7 and 8) are also keyed on to the rotating shaft 11, which is rotated by the motor 25 coaxial therewith. The teeth 26*a* each act on the lever 27 of a respective microswitch 28 during rotation of the shaft 11. As shown in FIG. 8, several cams 26 and several corresponding microswitches 28 are provided.

The cams 26 are keyed on to the shaft 11 in such a manner that the angular positioning of the teeth 26*a* relative to the levers 27 of the microswitches 28 causes the microswitches to be closed in rapid succession on rotating the shaft 11. The closure of each of the microswitches 28 causes an electrical discharge generator (not shown) to discharge via the electrode 9, 9A. Thus the successive closure of the various microswitches 28 generates a sequence of electrical discharges, each of which in practice occurs at one of the positions 9, 9′, 9″ . . . of the welding electrode, as required.

Figure 9:
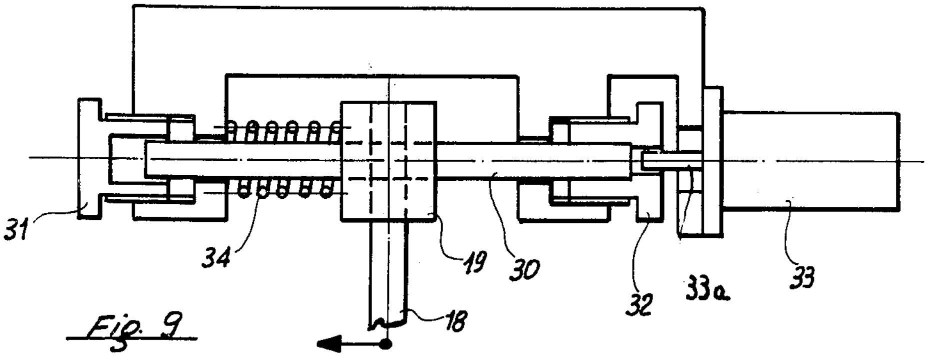
FIG. 9 is a diagrammatic plan view of a second unit for controlling the lateral movements of the welding electrode.

FIG. 9 shows diagrammatically a device which enables a double weld to be made on each wire 5. This generally consists of a first weld to obtain the actual fixing of the wire on to the terminal, and a second weld-,—with a higher current which partly burns the wire—to detach or at least weaken the end of the wire, for its subsequent removal (without the need for further cutting means).

Figure 5:
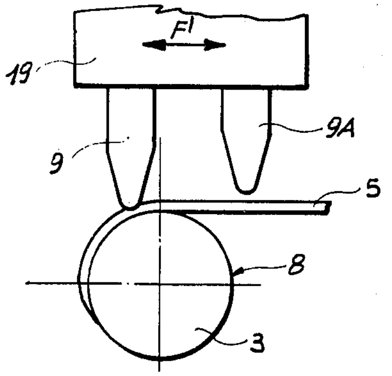
FIGS. 5 and 6 are axial diagrammatic views to a very enlarged scale of the manner of operating the electrode according to the invention for making a double weld.

The second weld is separated from the first by only one or two millimeters, but the two electrodes 9 and 9A are fixed on the head 19 at a sufficient distance apart to avoid geometrical and mechanical complications, and a short lateral dispacement is given to the head 19 between one weld and the next in the direction indicated by the arrow F′ in FIG. 5.

This displacement is obtained in that the head 19, which is carried at the end of the arm 18, is also rigid with the rod 30, which is mobile axially between two adjustable stops 31 and 32 in the form of bushes. This axial movement of the rod 30 is controlled by the rod 33*a* of the cylinder 33, against the action of the spring 34 coaxial with the rod 30.

Practical operation takes place in the following manner:

in a first welding stage, the electrode 9 is rested on the terminal 8 and is rocked in a first direction to make the first weld;

the cylinder 33 then acts to move the head 19 sideways;

in a second welding stage, the electrode 9A rests on the terminal 8 and is rocked in the opposite direction to make the second weld.

Figure 6:
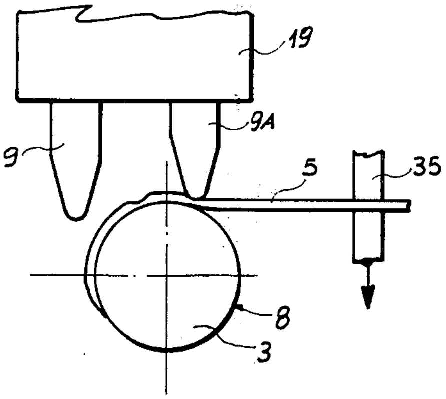

After the second weld, a gripper 35, shown only very diagrammatically in FIG. 6, tears off the end of the wire.

Figure 2:
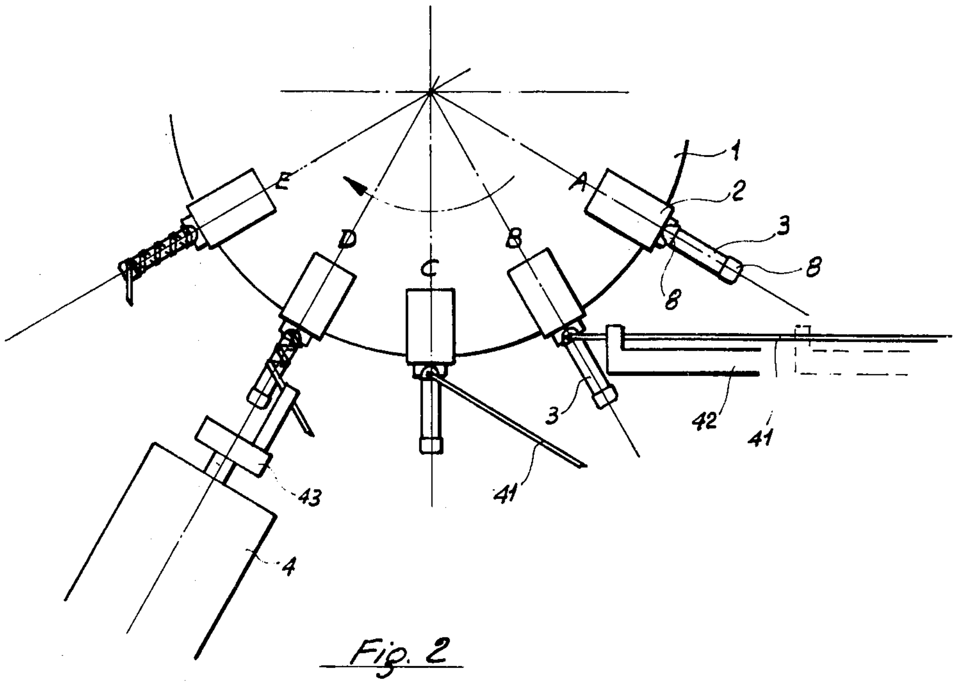
FIG. 2 is a view similar to that of FIG. 1, but relative to a machine equipped for manufacturing resistors from wound metal strip.

When a resistor using a thick wire or strip is to be manufactured, and which in practice requires just a few turns, the method—according to one particular aspect of the present invention—is slightly different from that indicated with reference to FIG. 1. The method is shown in FIG. 2, and is as follows:

after loading a rod 3 into station A, the initial end of a strip 41 is fed to one of the terminals 8 of the rod 3 by a feeder 42 operating in the station indicated by B. This initial end of the strip 41 is then welded in this station;

the feeder is then withdrawn by a predetermined amount equal to the length of strip necessary to produce the entire resistor winding, and the strip is then cut at this length, forming a strip portion firmly connected to the rod 3;

the rod 3 is then moved forward into a subsequent station, for example station D, together with the cut strip portion. This latter, as shown at station C, projects rigidly and obliquely from the rod 3 on account of its inherent rigidity;

finally, in station D a winding head 4 provided with a rotatable gripper 43, replacing the normal wire guide, grips the strip portion and winds it on the rod 3;

the tail end of the strip portion is then welded in a subsequent station to the other terminal of the rod 3.

Figure 10:
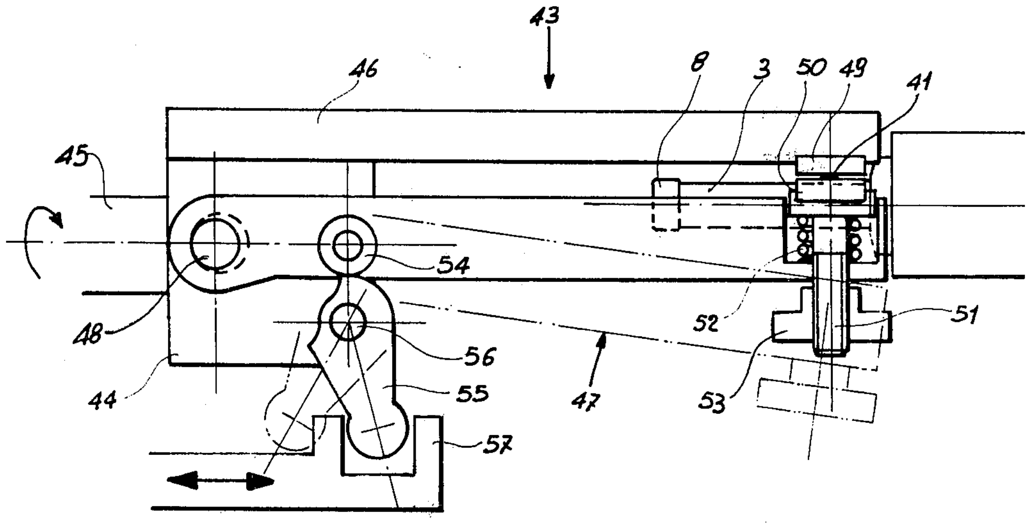
FIGS. 10 and 11 are diagrammatic elevational and plan views respectively of the strip winding unit for forming a resistor from strip wire.
Figure 11:
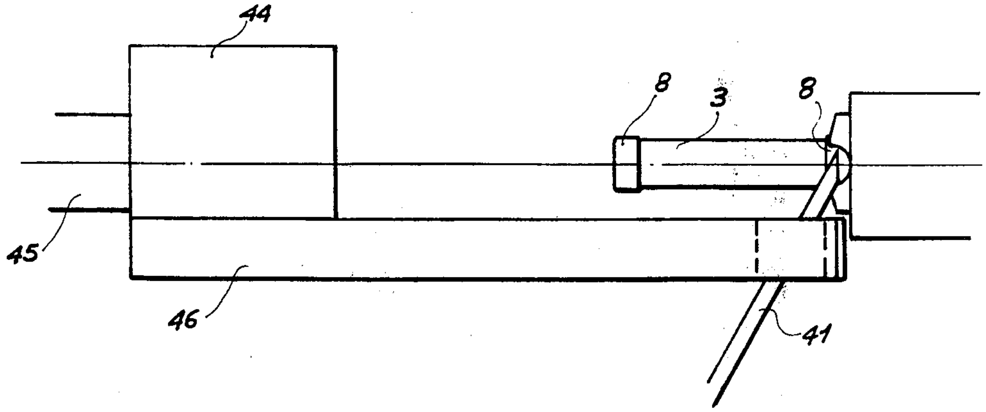

One possible embodiment of the rotatable gripper 43 is shown in FIGS. 10 and 11. It comprises a rigid support 44 fixed to the rotatable shaft 45 of the wire guide, and to which are connected a first arm 46 and a second arm 47 to form a gripper.

The arm 46 is rigidly mounted on the support 44, whereas the arm 47 is rotatably mounted on a pin 48 carried by the support 44.

Two friction pads 49 and 50 are fixed opposing each other at the ends of the two arms 46 and 47. The pad 49 is fixed on the end of the arm 46, whereas the pad 50 is carried by a pin 51 slidable in a seat formed at the end of the arm 47 and urged towards the other arm 46 by a spring 52, against the retaining action of an adjustment nut 53.

The arm 47 carries an idle roller 54 in an intermediate position between the pin 48 and pad 50. Against this idle roller there rests the profile of a cam 55, which is rotatable about the pin 56 carried by the support 44. The cam 55 may oscillate under the action of the operating hook 57, between a working position represented by full lines in FIG. 10, and a rest position indicated by dashed and dotted lines.

In the working position, the cam 55 urges the roller 54 upwards, and with it the arm 47, so bringing the pad 50 into contact with the fixed pad 49; The contact pressure is determined both by the spring means 52, and by the position of the fulcrum constituted by the pin 48. In this respect, this latter is mounted eccentrically to enable the pressure between the two friction pads 49 and 50 to be adjusted.

The wire, or rather the strip 41 already welded at one end to the terminal 8 of the rod 3 and projecting obliquely therefrom is clamped between said two pads. The clamping pressure of the strip 41 between the pads 49 and 50 is adjusted to a fairly low value, so that the strip can slide between the pads and wind on to the rod 3 as the gripper 43 rotates.

After winding, the tail end of the strip 41 is welded to the other terminal of the rod 3, and any end portion remaining beyond the weld (such as the end shown in FIG. 2 at station E) is then cut off. This cut end anyhow represents a much smaller amount of scrap than the amount represented by the wire portion lying between two successive resistors under formation.

On completion of the winding, the gripper 43 is opened by moving the cam 55 into the position indicated by the dashed and dotted lines. This causes the arm 47 to oscillate downwards, so opening the gripper to a sufficient extent to enable the rod 3 to pass freely between the two arms of the gripper when the table 1 is rotated to transfer the rods into their next stations.

The invention is not limited to the particular embodiments described, and various modifications, all within the scope of an expert of the art, and all falling within the scope of the inventive idea, can be made thereto.

I claim:

1. A method for electrically welding the ends of metal wires to metal terminals of electrical resistors formed from wire wound on an insulating rod, of the type in which said terminals have an essentially cylindrical surface on which the wire to be welded is rested obliquely and transversely to a generating or axial welding line, wherein:

at least one welding electrode is used, of thin, elongated arcuate profile with its convexity facing the wire to be welded, one of the ends of said arcuate profile of said electrode is placed in contact with the surface of the metal terminal, the electrode is then given a rocking movement, the centre of instantaneous rotation of which coincides with the point of contact of the electrode with the surface of the terminal, and is gradually moved along said generating or axial welding line, and several electrical welding discharges are fed in rapid succession to said point of contact, through said electrode, during the rocking movement thereof.

2. A method as claimed in claim 1, wherein, in using metal wires of semi-rigid or strip form:

the initial end of the wire is fed until it comes into contact with one of the metal terminals, said initial end is welded to the terminal, the wire is cut at a predetermined distance from the point of welding, to form a portion of semi-rigid wire of determined length connected to said terminal, and said wire portion is then wound on to the insulating rod, and its tail end is welded to the terminal on completion of winding.

3. An apparatus for automatically welding the ends of metal wires to metal terminals, comprising:

at least one essentially flat welding electrode lying in a plane passing through said generating or axial welding line and of thin arcuate profile with its convexity facing the wire to be welded, resilient pressing means for keeping the electrode profile in contact with the welding surface, means for giving the electrode a rocking movement, the centre of instantaneous rotation of which is constituted by the point of contact of the electrode with the welding surface, this point of contact being progressively moved along said generating or axial welding line, and condenser discharge means for feeding several electrical welding discharges in succession through said electrode.

4. An apparatus as claimed in claim 3, wherein the welding electrode is mounted at the end of an oscillating arm which is freely pivoted at its other end about an axis, perpendicular to the plane in which the electrode lies, and on a pivot carried by a member provided with reciprocating movement in a direction parallel to the main axis of the electrode.

5. An apparatus as claimed in claim 4, wherein said reciprocating movement is produced by a cam keyed on to a main drive shaft with axis parallel to the axis of oscillation of the arm carrying the electrode support head.

6. An apparatus as claimed in claim 3, wherein said resilient pressing means are constituted by a pressure rod slidable along the main axis of the electrode and resting on an electrode support head, said rod being urged by a pneumatic cylinder via adjustable spring means.

7. An apparatus as claimed in claim 3, comprising two identical welding electrodes mounted parallel and side-by-side, on an electrode support head, these electrodes operating in succession to produce two side-by-side welding points for the wire on the relative metal terminal.

8. An apparatus as claimed in claim 7, wherein means are associated with said electrode support head to impart a sideways movement to the head in order to bring one or the other of said electrodes alternately into contact with the welding surface.

9. An apparatus as claimed in claim 3, wherein on a main drive shaft there is mounted a plurality of parallel cams, each provided with a tooth for operating a respective microswitch, the operation of which causes an electrical welding discharge to be fed through the electrode.

10. An apparatus as claimed in claim 9, wherein the teeth of said cams are displaced angularly relative to each other, with reference to the relative microswitches, so as to cause these latter to operate in succession.

11. An apparatus as claimed in claim 9 or 10, wherein the microswitches are all connected in parallel to a single electrical welding discharge generator.

12. An apparatus as claimed in claim 3, wherein a wire guide in the form of a gripper is provided for winding a portion of semi-rigid wire or strip, already welded at its initial end to a respective terminal.

13. An apparatus as claimed in claim 12, wherein said gripper is formed from a pair of arms each carrying a friction pad at its end, the two friction pads being pressed together under light pressure, to enable the wire clamped between them to slide.

14. An apparatus as claimed in claim 13, wherein means are provided for adjusting said light holding pressure between one friction pad and the other.

15. An apparatus as claimed in claim 12, wherein said gripper comprises a rigid support member to which a first gripper arm is rigidly connected, the other gripper arm being mounted rotatably about a pin carried by the support.

16. An apparatus as claimed in claim 14 or 15, wherein said pin carrying the rotating gripper arm is an eccentric pin, the position of which is adjustable to adjust said light holding pressure of the gripper.

17. Apparatus for electrically welding the ends of metal wires to metal terminals of electrical resistors formed from wire wound on an insulating rod, of the type in which said terminals have an essentially cylindrical surface on which the wire to be welded is rested obliquely and transversely to a generating or axial welding line, comprising:

at least one welding electrode of thin, elongated arcuate profile with its convexity facing the wire to be welded, means for placing one of the ends of said arcuate profile of said electrode in contact with the surface of the metal terminal, means for giving the electrode a rocking movement, the center of instantaneous rotation of which coincides with the point of contact of the electrode with the surface of the terminal, means for gradually moving said electrode along said generating or axial welding line, and means for feeding several electrical welding discharges in rapid succession to said point of contact, through said electrode, during the rocking movement thereof.

* * * * *